(12) United States Patent
Maruyama (10) Patent No.: US 9,339,963 B2
(45) Date of Patent: May 17, 2016

(54) CONTROLLER FOR AN INJECTION MOLDING MACHINE HAVING AN ABNORMALITY DETECTION UNIT

(71) Applicant: FANUC CORPORATION, Minamitsuru-gun, Yamanashi (JP)

(72) Inventor: Junpei Maruyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/707,034

(22) Filed: May 8, 2015

(65) Prior Publication Data

US 2015/0321405 A1    Nov. 12, 2015

(30) Foreign Application Priority Data

May 12, 2014    (JP) .................. 2014-098586

(51) Int. Cl.
*B29C 45/84*    (2006.01)
*B29C 45/76*    (2006.01)

(52) U.S. Cl.
CPC ... *B29C 45/7666* (2013.01); *B29C 2945/76033* (2013.01); *B29C 2945/76454* (2013.01); *B29C 2945/76525* (2013.01)

(58) Field of Classification Search
CPC .................. B29C 45/7666; B29C 2945/76033; B29C 2945/76454; B29C 2945/76525

USPC ......................................................... 425/151
See application file for complete search history.

(56) References Cited

U.S. PATENT DOCUMENTS 6,333,611 B1    12/2001    Shibuya et al.

FOREIGN PATENT DOCUMENTS

| EP | 2522481 A1 | 11/2012 |
|----|---|---|
| JP | 2000141440 A | 5/2000 |
| JP | 2012-135913 A | 7/2012 |
| JP | 2012240199 A | 12/2012 |
| JP | 2013-18152 A | 1/2013 |

OTHER PUBLICATIONS

Office Action mailed Jul. 7, 2015, corresponding to Japanese patent application No. 2014-098586.

*Primary Examiner* — Tim Heitbrink
(74) *Attorney, Agent, or Firm* — Hauptman Ham, LLP (57) ABSTRACT

A controller of an injection molding machine includes a power supply converter which supplies electric power from a power supply to a drive device which drives a servomotor, and an electric storage unit coupled between the power supply converter and the drive device. The controller detects abnormality of a voltage detection unit which detects voltage of the electric storage unit based on voltage of the electric storage unit, a supply electric energy to the electric storage unit, and electrostatic capacity of the electric storage unit.

5 Claims, 5 Drawing Sheets

CONTROLLER FOR AN INJECTION MOLDING MACHINE HAVING AN ABNORMALITY DETECTION UNIT

RELATED APPLICATIONS

The present application claims priority of Japanese Application Number 2014-098586 filed May 12, 2014, the disclosure of which is hereby incorporated by reference herein in its entirety.

BACKGROUND OF THE INVENTION

1. Field of the Invention

The present invention relates to a controller of an injection molding machine having an abnormality detection unit of a voltage detection unit.

2. Description of the Related Art

An injection device and a mold clamping device in an injection molding machine are driven using servomotors, and it is general that drive power is supplied to the servomotors from a drive device of a motor to drive a screw and a movable platen back and forth. Here, in the injection device, it is necessary to move the screw back and forth at high speed, and in the mold clamping device, it is necessary to move the movable platen which supports a mold back and forth at high speed. Therefore, large electric power is required.

When the servomotor is driven with high output, it is necessary to supply large electric power to the servomotor from an amplifier. Especially in the case of high speed injection for molding a thin article and in the case of high speed clamping for compression molding, although time during which the motor operates at high speed is short, since large electric power is temporarily supplied to the motor, there is concern that a power supply device becomes large in size. To solve this problem, it is known that a DC voltage unit of a drive device which drives the servomotor is provided with an electric storage unit, voltage of the electric storage unit is boosted to store energy which is necessary at the time of high speed operation, thereby preventing the power supply device from becoming large.

Japanese Patent Application Laid-Open No. 2000-141440 A discloses a technique in which regenerative electric power generated by a motor is stored in an electric storage unit during a deceleration period of the motor and the electric power stored in the electric storage unit is supplied to drive power side during an acceleration period of the motor. Japanese Patent Application Laid-Open No. 2012-240199 A discloses a technique in which a power supply converter is operated in a normal direction only for a predetermined period in a molding cycle of an injection molding machine so that voltage between two poles of DC link becomes equal to predetermined target voltage.

In any of the techniques, a voltage detecting circuit detects voltage of the electric storage unit, and output of the power supply converter is controlled such that the detected voltage becomes equal to the target voltage. At this time, if it is not possible to normally detect voltage due to trouble of the voltage detecting circuit, there is concern that voltage of the electric storage unit becomes overvoltage. For example, when voltage cannot be detected normally and voltage which is lower than actual voltage is detected, there is concern that although the actual voltage is higher than the target voltage, supply of electric power to the electric storage unit is continued and as a result, voltage of the electric storage unit becomes overvoltage.

To prevent this problem, it is possible to take methods of providing a preliminary voltage detecting circuit or providing an overvoltage preventing circuit, but since these methods require to provide an additional circuit, there is concern that costs are increased.

SUMMARY OF THE INVENTION

It is an object of the present invention to provide a controller of an injection molding machine capable of detecting an abnormality of a voltage detection unit of an electric storage unit without requiring a special device such as an additional circuit.

The present invention provides a controller of an injection molding machine comprising: a servomotor for driving an axis; a drive device for driving the servomotor; a power supply; a power supply converter for boosting voltage from the power supply and for supplying electric power to the drive device; an electric storage unit coupled between the power supply converter and the drive device; a voltage detection unit for detecting voltage of the electric storage unit; an electric energy detection unit for detecting a supply electric energy from the power supply to the electric storage unit; and an abnormality detection unit for detecting abnormality of the voltage detection unit based on voltage of the electric storage unit detected by the voltage detection unit, a supply electric energy to the electric storage unit detected by the electric energy detection unit, and electrostatic capacity of the electric storage unit.

According to the present invention, abnormality of the voltage detection unit is detected based on the supply electric energy from the power supply to the electric storage unit, the detected voltage value of the electric storage unit, and the electrostatic capacity of the electric storage unit. Therefore, it is possible to detect an abnormality or a trouble of the voltage detection unit of the electric storage unit without providing a special device such as a preliminary voltage detecting circuit.

The abnormality detection unit may calculate electrostatic energy accumulated in the electric storage unit based on voltage of the electric storage unit detected by the voltage detection unit and electrostatic capacity of the electric storage unit, compares the calculated electrostatic energy of the electric storage unit and a supply electric energy to the electric storage unit detected by the electric energy detection unit with each other, and detects abnormality of the voltage detection unit based on a result of the comparison.

The abnormality detection unit may calculate an estimated voltage value of the electric storage unit based on a supply electric energy to the electric storage unit detected by the electric energy detection unit and electrostatic capacity of the electric storage unit, compares the calculated estimated voltage value of the electric storage unit and voltage of the electric storage unit detected by the voltage detection unit with each other, and detects abnormality of the voltage detection unit based on a result of the comparison.

The controller may further include an elapsed time measuring unit for measuring time elapsed from arbitrary time during a boosting operation until voltage detected by the voltage detection unit reaches boosted voltage, wherein the abnormality detection unit calculates boosting time of the electric storage unit based on a supply electric energy to the electric storage unit detected by the electric energy detection unit, electrostatic capacity of the electric storage unit, and a boosted voltage value of the electric storage unit, compares the calculated boosting time of the electric storage unit and the elapsed time measured by the elapsed time measuring unit with each other, and detects abnormality of the voltage detection unit based on a result of the comparison.

The electric energy detection unit may detect a supply electric energy to the electric storage unit by integrating, with respect to time, any one of electric power supplied from the power supply converter to the electric storage unit and electric power obtained by subtracting power consumption of the servomotor which consumes electric power of the electric storage unit from electric power supplied from the power supply converter to the electric storage unit.

According to the present invention, it is possible to provide a controller of an injection molding machine capable of detecting an abnormality of a voltage detection unit of an electric storage unit without requiring a special device such as an additional circuit.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Figure 1:
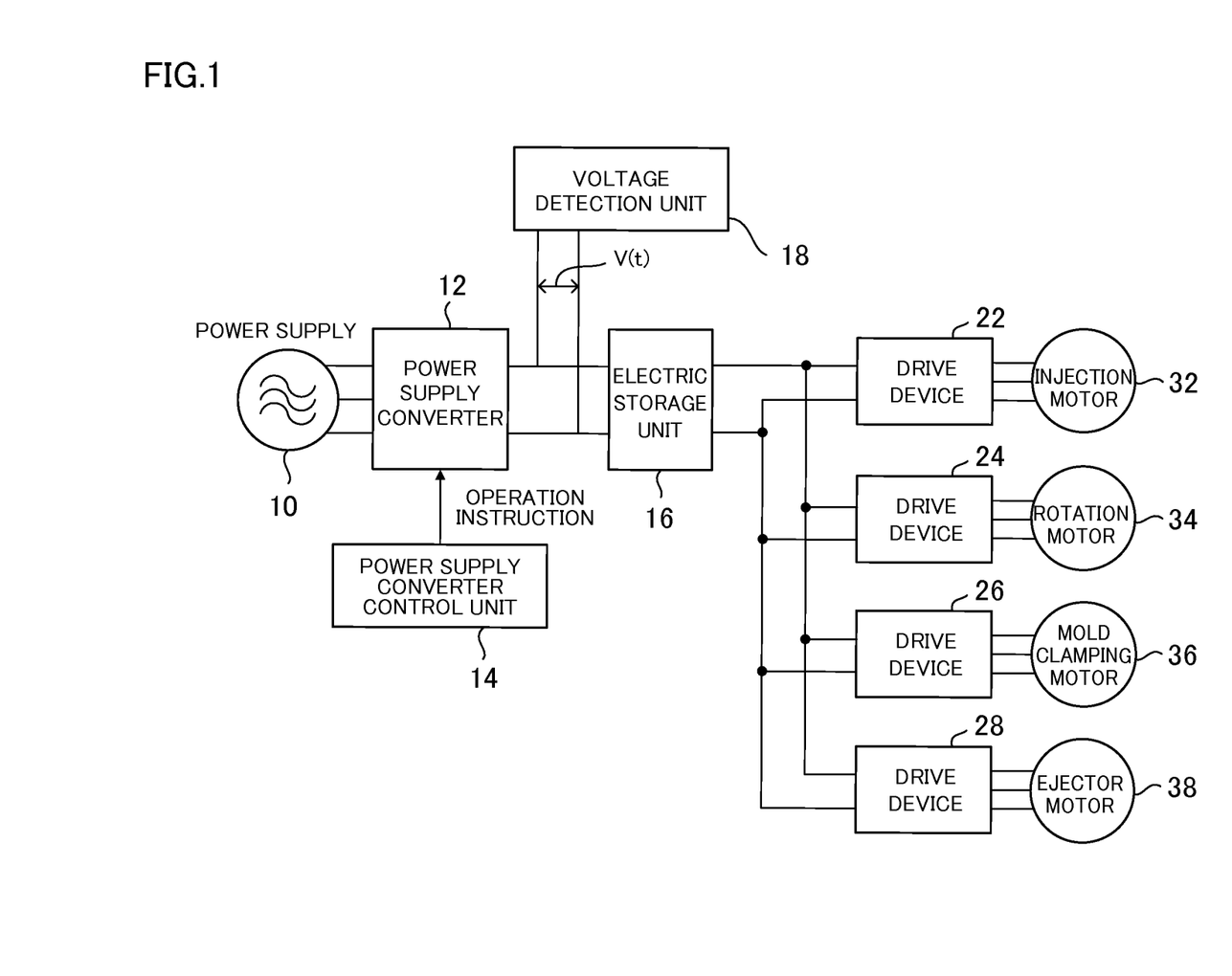
FIG. 1 is a diagram for describing a servomotor drive circuit of an injection molding machine configuring a controller of the injection molding machine of the present invention.

A servomotor drive circuit of an injection molding machine configuring a controller of the injection molding machine according to the present invention will be described with reference to FIG. 1.

A power supply converter 12 is connected to a power supply unit 10. The power supply converter 12 converts three-phase AC voltage supplied from the power supply unit 10 into DC voltage, and a known PWM converter can be used as the power supply converter 12. Before AC is converted into DC in the power supply converter 12, it is also possible to convert AC into DC after voltage from the power supply unit 10 is boosted by a boosting transformer. A power supply converter control unit 14 issues an operation instruction to the power supply converter 12. An electric storage unit 16 is connected to the power supply converter 12.

The electric storage unit 16 is composed of one or more modularized capacitors, and is connected to drive devices (first, second, third and fourth drive devices 22, 24, 26 and 28) which drive a servomotor. The first, second, third and fourth drive devices 22, 24, 26 and 28 are inverters which PWM-convert DC and output three-phase AC motor drive power. The electric storage unit 16 may be capacitors incorporated in the first, second, third and fourth drive devices 22, 24, 26 and 28 and the power supply converter 12, or may be composed of capacitor modules and battery modules separately placed in the first, second, third and fourth drive devices 22, 24, 26 and 28 and the power supply converter 12. The electric storage unit 16 and the drive devices (first, second, third and fourth drive devices 22, 24, 26 and 28) may be coupled directly to each other, or discharge and charge circuits may be provided between the electric storage unit 16 and the drive devices (first, second, third and fourth drive devices 22, 24, 26 and 28).

The first drive device 22 drives an injection motor 32 which drives a screw in an axial direction, the second drive device 24 drives a rotation motor 34 which rotates the screw, the third drive device drives a mold clamping motor 36 which drives a movable platen back and forth to open and close a mold, and the fourth drive device 28 drives an ejector motor 38 which ejects a molded product.

A voltage detection unit 18 detects, as voltage of the electric storage unit 16, voltage between two wires which connect the power supply converter 12 and the electric storage unit 16 to each other. The voltage detection unit 18 may be provided on the electric storage unit 16. When the electric storage unit 16 and a power supply converter 12 are coupled directly to each other as shown in FIG. 1, it is also possible to provide the voltage detection unit 18 on the power supply converter 12, since voltage values of the electric storage unit 16 and the power supply converter 12 substantially match with each other. When the electric storage unit 16 and the drive devices (first, second, third and fourth drive devices 22, 24, 26 and 28) are coupled directly to each other, it is also possible to provide the voltage detection unit 18 on the drive devices (first, second, third and fourth drive devices 22, 24, 26 and 28), since voltage values of the electric storage unit 16 and a motor drive unit substantially match with each other. A location where the voltage detection unit 18 is placed may appropriately be changed only if the voltage value of the electric storage unit 16 can directly or indirectly be detected.

First, a first method of abnormality detection of the voltage detection unit in the servomotor drive circuit of the injection molding machine shown in FIG. 1 will be described using FIGS. 2 and 3. In this method, a power supply amount from the power supply unit to the electric storage unit and electrostatic energy accumulated in the electric storage unit are compared with each other, and abnormality of the voltage detection unit is detected.

Assuming that power supply amount from the power supply unit 10 to the electric storage unit 16 during a period between time t0 and t is A, A can be calculated by the following equation (1).

$$\int_{t0}^{t}(Wps)dt=A$$

Wps: output of power supply converter     (1)

The output Wps of the power supply converter 12 may be detected by providing a current detection unit (not shown) on the power supply converter 12, or may be a fixed value based on various values of the power supply converter 12. It is also possible to set the value while taking into consideration a detection error caused at the time of detection.

Assuming that electrostatic energy accumulated in the electric storage unit 16 during a period between time t0 and t is B, B can be calculated by the following equation (2).

$$\frac{1}{2}C(V(t)^2 - V(t_0)^2) = B \qquad (2)$$

C: electrostatic capacity of electric storage unit,

V(t): voltage of electric storage unit

A value based on various values of the electric storage unit 16 may be used as the electrostatic capacity C of the electric storage unit 16, or an capacitance detection unit which detects electrostatic capacity of the electric storage unit 16 may be used, and a value detected by the capacitance detection unit may be used as the electrostatic capacity C. Since there is an error or a variation caused by individual difference in the electrostatic capacity of the electric storage unit 16, it is also possible to employ a value in which the error or the variation is taken into consideration.

Abnormality of the voltage detection unit 18 of the electric storage unit 16 is detected based on the value A (power supply amount to electric storage unit 16) and the value B (electrostatic energy accumulated in electric storage unit 16). In a zone "normal voltage detection" in FIG. 2, a detected value of voltage of the electric storage unit 16 and the actual value match with each other as shown in the graph (a) in FIG. 2, and the power supply amount A to the electric storage unit 16 and the electrostatic energy B accumulated in the electric storage unit 16 match with each other.

Figure 2:
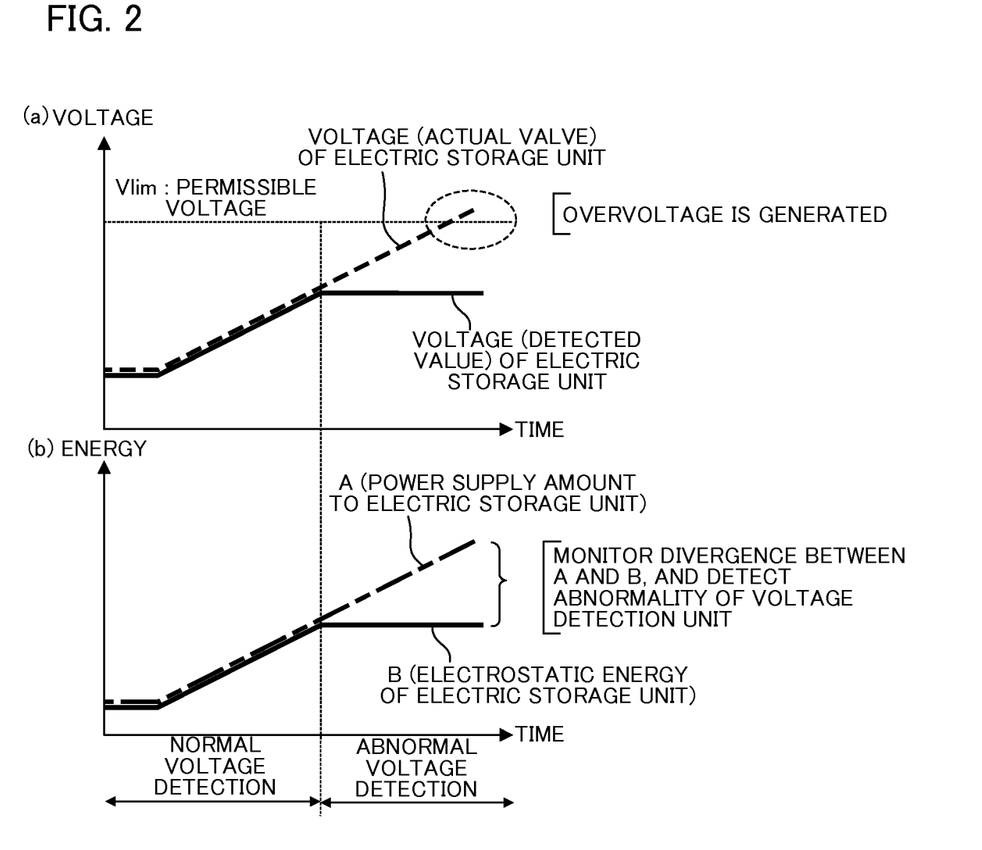
FIG. 2 is a diagram for describing a first method of abnormality detection of a voltage detection unit in the servomotor drive circuit of the injection molding machine shown in FIG. 1.

In a zone "abnormal voltage detection" in FIG. 2, however, a voltage value of the electric storage unit 16 is not normally detected, and is detected lower than the actual value as shown in the graph (a) in FIG. 2, and even if the detected value does not exceed permissible voltage Vlim, the actual voltage value exceeds the permissible voltage Vlim, and overvoltage is generated in some cases. At this time, since the electrostatic energy B accumulated in the electric storage unit 16 is calculated using voltage V(t) of the electric storage unit 16 (see equation (2)), a calculated value B of the electrostatic energy of the electric storage unit 16 calculated by the equation (2) becomes smaller than a calculated value A of the power supply amount to the electric storage unit 16 (B<A) as shown in the graph (b) in FIG. 2. In such a case, it is determined that the voltage value of the electric storage unit 16 used for calculation of the electrostatic energy B accumulated in the electric storage unit 16 is not normally detected, and therefore abnormality of the voltage detection unit is detected.

Contrary to the case shown in the graph (a) in FIG. 2, when voltage of the electric storage unit 16 is boosted, the voltage detection unit 18 of the electric storage unit 16 is not detected normally but is detected higher than the actual value in some cases. In such a case, since the electrostatic energy B accumulated in the electric storage unit 16 is calculated using a voltage value of the electric storage unit 16 as shown in the equation (2), the calculated value of the electrostatic energy B of the electric storage unit 16 becomes larger than the calculated value of the power supply amount A to the electric storage unit 16 (B<A). In such as case, since the actual voltage value is lower than the detected value, there is no concern that the electric storage unit 16 is damaged by overvoltage, but since the voltage of the electric storage unit 16 is lower than the actual value, energy which can be supplied from the electric storage unit 16 becomes small, and there is concern that performance of the injection molding machine is lowered. Hence, in this case also, abnormality of the voltage detection unit 18 may be detected, assuming that the voltage value of the electric storage unit 16 used for calculation of the electrostatic energy B of the electric storage unit 16 is not detected normally.

Power supply amount A to the electric storage unit 16 during a period between time t0 and t is calculated using the above equation (1), and the calculated value A is compared with the electrostatic energy B accumulated in the electric storage unit, but when the power supply amount A to the electric storage unit 16 is calculated, it is also possible to use the following equation (3) instead of the equation (1).

$$\int_{t0}^{t}(Wps-Wm)dt=A$$

Wm: motor power consumption  (3)

In the above equation (3), the power supply amount A to the electric storage unit 16 is determined by integrating during a period between time t0 and t a value (Wps−Wm) obtained by subtracting motor power consumption Wm from output Wps of the power supply converter 12. The motor power consumption Wm is power consumption of the motor which consumes electrostatic energy of the electric storage unit 16. This motor power consumption Wm may be obtained based on motor drive current or motor rotation speed, or may be a fixed value based on various values of the motor.

Figure 3:
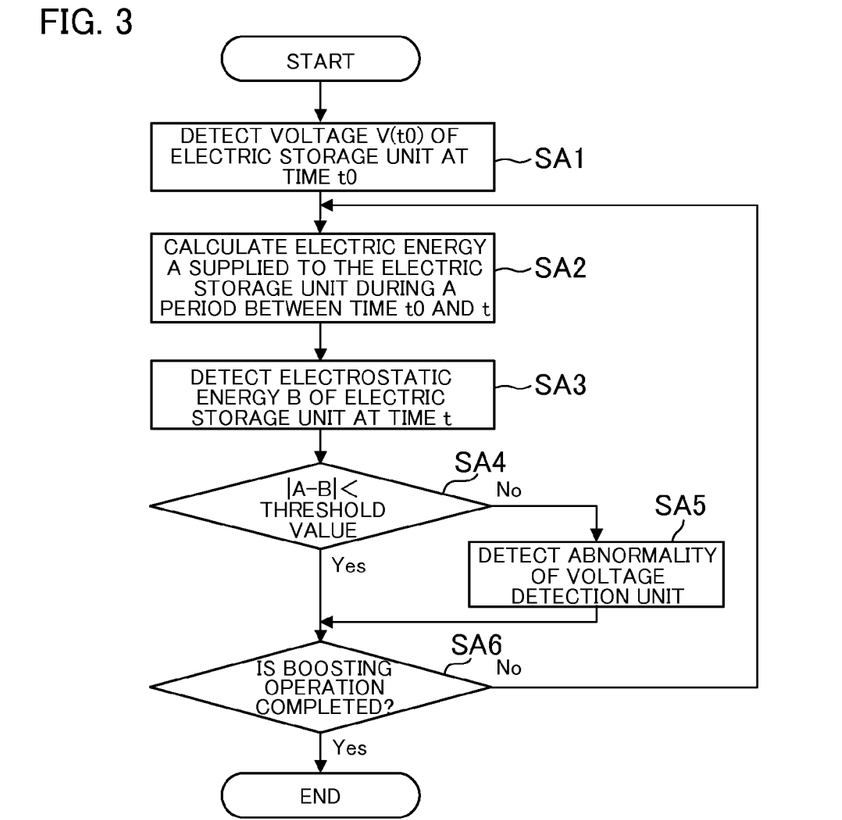
FIG. 3 is a flowchart showing a flow of processing (first method) of abnormality detection of the voltage detection unit in the servomotor drive circuit of the injection molding machine shown in FIG. 1.

FIG. 3 is a flow of processing (first method) of abnormality detection of the voltage detection unit in the servomotor drive circuit of the injection molding machine. Description is given below in line with the steps of the flowchart.

(Step SA1) Voltage V(t0) of the electric storage unit at time t0 is detected.

(Step SA2) The power supply amount A supplied to the electric storage unit during a period between time t0 and t is calculated.

(Step SA3) The electrostatic energy B accumulated in the electric storage unit at time t is calculated.

(Step SA4) It is determined whether or not an absolute value of a difference between the power supply amount A and the electrostatic energy B is less than a predetermined threshold value. If the absolute value is less than the threshold value (Yes), the procedure proceeds to step SA6, and if not (No), the procedure proceeds to step SA5.

(Step SA5) The voltage detection unit is detected as abnormal.

(Step SA6) It is determined whether a boosting operation is completed or not. If the boosting operation is completed (Yes), the procedure is completed, and if not (No), the procedure returns to step SA2.

In step SA2, using the equation (3) instead of the equation (1), it is also possible to calculate the power supply amount A supplied to the electric storage unit 16 using an integrated value of the value (Wps−Wm) obtained by subtracting the power consumption Wm of the motor from the output Wps of the power supply converter 12 during a period between time t0 and t.

Next, a second method of abnormality detection of the voltage detection unit in the servomotor drive circuit of the injection molding machine in FIG. 1 will be described using FIG. 4. In this method, voltage of the electric storage unit is estimated, and therefore abnormality of the voltage detection unit is detected based on the estimated value.

The voltage V(t) of the electric storage unit 16 is estimated from the equations (1) and (2), and when the estimated voltage exceeds predetermined voltage, abnormality of the voltage detection unit 18 is detected. Assuming that estimated voltage value of the electric storage unit 16 is Vest(t), and if Vest(t)=V(t) and A=B in the equations (1) and (2), the following equation (4) is obtained.

$$Vest(t) = \sqrt{\frac{2}{C}\int_{t0}^{t}(Wps)dt + V(t_0)^2} \tag{4}$$

Vest(t): estimated voltage value

Figure 4:
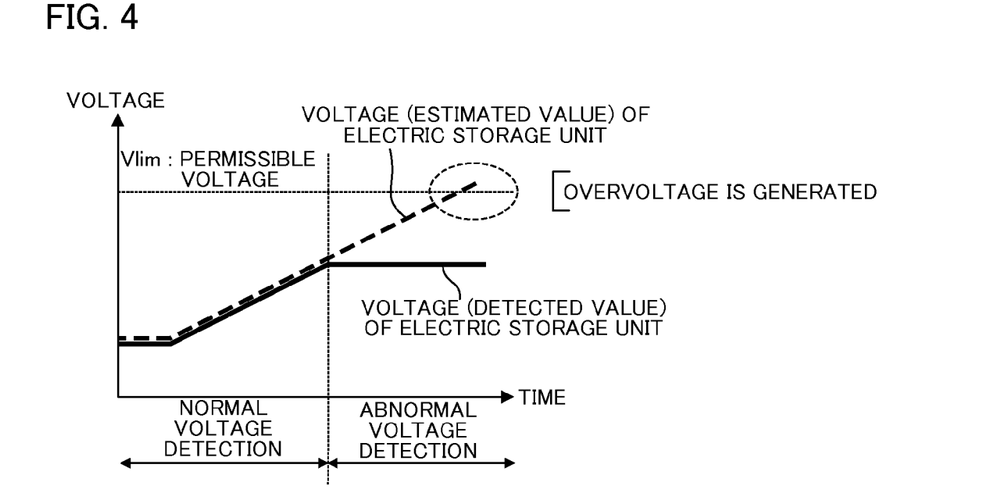
FIG. 4 is a diagram for describing a second method of abnormality detection of the voltage detection unit in the servomotor drive circuit of the injection molding machine shown in FIG. 1.

In a zone "normal voltage detection" in FIG. 4, an estimated value of voltage of the electric storage unit 16 and a detected value substantially match with each other. In a zone "abnormal voltage detection", however, if the estimated value of voltage of the electric storage unit 16 rises as shown in FIG. 4 and the estimated voltage value exceeds a permissible voltage Vlim, abnormality of the voltage detection unit 18 is detected, considering that overvoltage may be generated in the electric storage unit 16. As another method, when a difference between the estimated voltage value Vest(t) and the detected voltage value V(t) becomes larger than a predetermined threshold value, abnormality of the voltage detection unit 18 may be detected, considering that a voltage value of the electric storage unit 16 cannot be detected normally.

Figure 5:
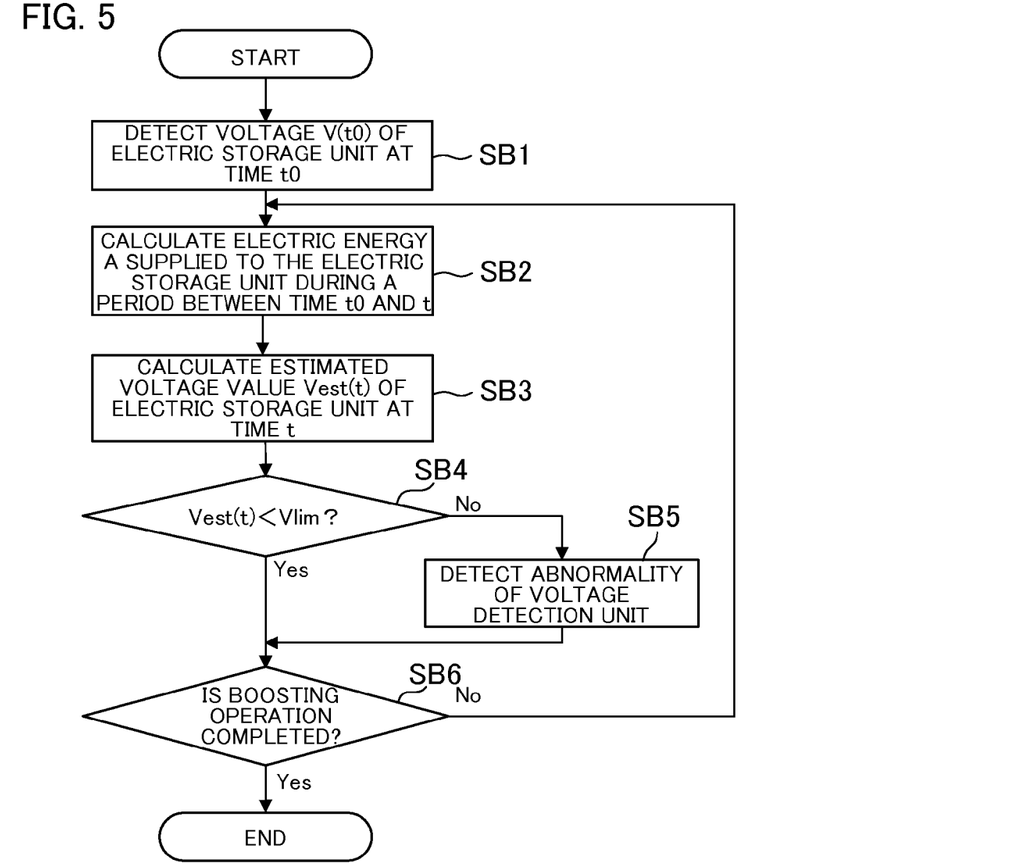
FIG. 5 is a flowchart showing a flow of processing (second method) of abnormality detection of the voltage detection unit in the servomotor drive circuit of the injection molding machine shown in FIG. 1.

FIG. 5 is a flowchart showing a flow of processing (second method) of abnormality detection of the voltage detection unit in the servomotor drive circuit of the injection molding machine. Description is given below in line with the steps of the flowchart.

(Step SB1) Voltage V(t0) of the electric storage unit at time t0 is detected.

(Step SB2) The power supply amount A supplied to the electric storage unit during a period between time t0 and t is calculated.

(Step SB3) Estimated voltage value Vest(t) of the electric storage unit at time t is calculated.

(Step SB4) It is determined whether or not the estimated voltage value Vest (t) of the electric storage unit is less than permissible voltage Vlim. If Vest(t) is less than Vlim (Yes), the procedure proceeds to step SB6, and if Vest(t) is not less than a threshold value (No), the procedure proceeds to step SB5.

(Step SB5) The voltage detection unit is detected as abnormal.

(Step SB6) It is determined whether a boosting operation is completed or not. If the boosting operation is completed (Yes), the procedure is completed, and if not (No), the procedure returns to step SB2.

In step SB4, instead of determining whether or not the estimated voltage value Vest(t) of the electric storage unit is less than the permissible voltage Vlim, it is also possible to determine whether or not a difference between the estimated voltage value Vest(t) of the electric storage unit and the detected voltage value V(t) becomes larger than a predetermined threshold value.

Next, a third method of abnormality detection of the voltage detection unit in the servomotor drive circuit of the injection molding machine in FIG. 1 will be described using FIGS. 6 and 7. In this method, abnormality of the voltage detection unit is detected based on time (boosting time) required to boost voltage of the electric storage unit to predetermined boosted voltage.

In the above equations (1) and (2), if the output Wps of the power supply converter 12 is a fixed value and the voltage V(t) of the electric storage unit 16 is assumed to be boosted voltage Vbst, then the following equation (5) is obtained.

$$Tbst = \frac{C}{2Wps}(Vbst^2 - V(t_0)^2) \tag{5}$$

Tbst: boosting time, Vbst: boosted voltage

Figure 6:
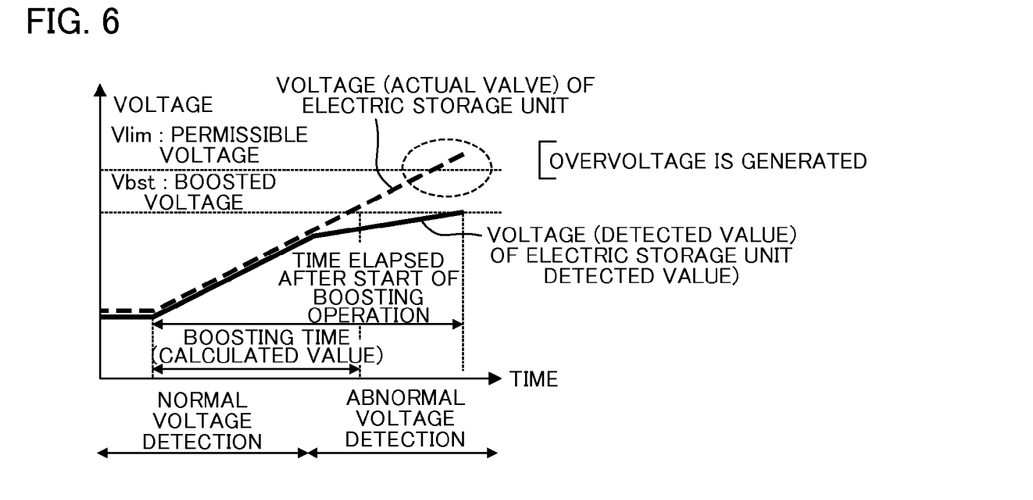
FIG. 6 is a diagram for describing a third method of abnormality detection of the voltage detection unit in the servomotor drive circuit of the injection molding machine shown in FIG. 1.

In a zone "normal voltage detection" in FIG. 6, a detected value of boosted voltage and an actual value substantially match with each other. In a zone "abnormal voltage detection", however, time required to reach predetermined boosted voltage Vbst becomes longer than time required to reach actual boosted voltage. In such a case, time elapsed after time t0 is measured, and if the measured elapsed time exceeds boosting time Tbst which is a calculated value, it is determined that overvoltage is generated in the electric storage unit 16, and therefore abnormality of the voltage detection unit 18 can be detected. As another method, when a difference between time elapsed after time t0 to completion of the boosting operation and boosting time Tbst which is the calculated value (boosting time required to reach the boosted voltage Vbst from voltage V(t0) of electric storage unit at time t0) becomes larger than a predetermined threshold value, abnormality of the voltage detection unit 18 may be detected, considering that a voltage value of the electric storage unit 16 is not detected normally.

Figure 7:
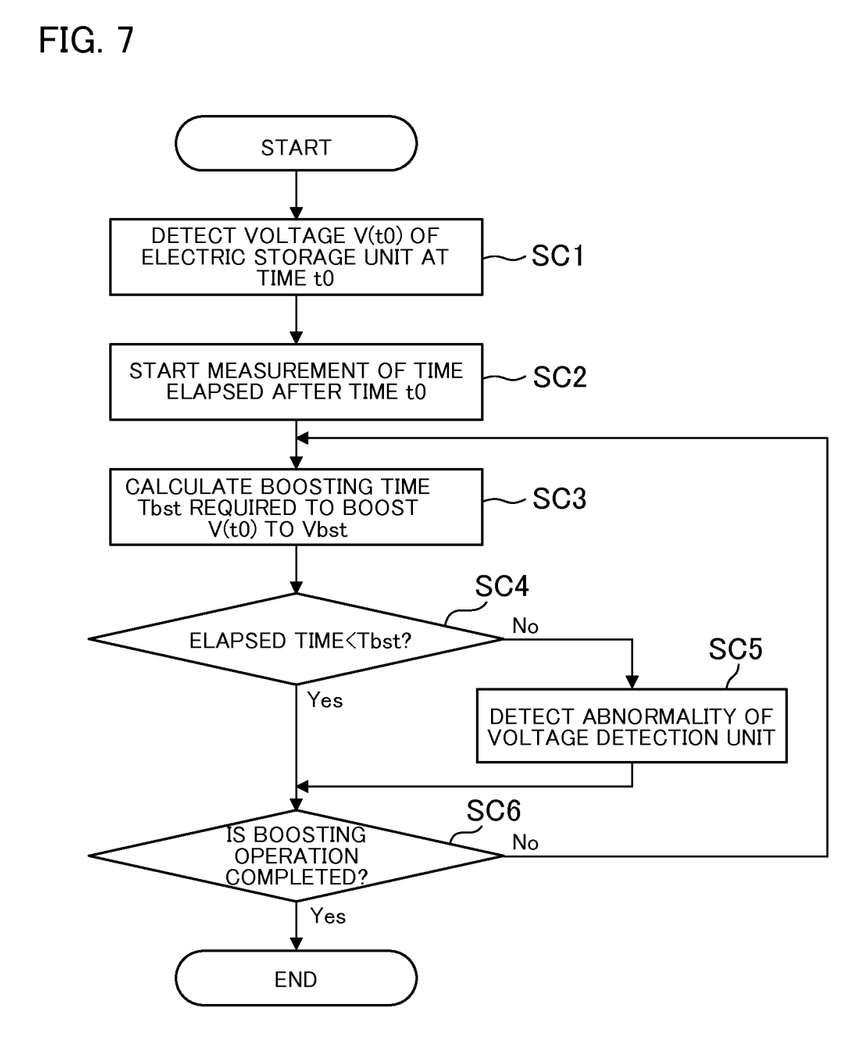
FIG. 7 is a flowchart showing a flow of processing (third method) of abnormality detection of the voltage detection unit in the servomotor drive circuit of the injection molding machine shown in FIG. 1.

FIG. 7 is a flowchart showing a flow of processing (third method) of abnormality detection of the voltage detection unit in the servomotor drive circuit of the injection molding machine. Description is given below in line with the steps of the flowchart.

(Step SC1) Voltage V(t0) of the electric storage unit at time t0 is detected.

(Step SC2) Measurement of time elapsed after time t0 is started.

(Step SC3) Boosting time Tbst required to boost voltage V(t0) to boosted voltage Vbst is calculated.

(Step SC4) It is determined whether or not time elapsed after time t0 is less than boosting time Tbst. If the elapsed time is less than boosting time Tbst (Yes), the procedure proceeds to step SC6, and if the elapsed time is not less than a threshold value (No), the procedure proceeds to step SC5.

(Step SC5) The voltage detection unit is detected as abnormal.

(Step SC6) It is determined whether the boosting operation is completed or not. If the boosting operation is completed (Yes), the procedure is completed, and if not (No), the procedure returns to step SC3.

In step SC4, instead of determining whether or not time elapsed after time t0 is less than the boosting time Tbst, it is also possible to determine whether or not a difference between time elapsed after time t0 to completion of the boosting operation and the boosting time Tbst which is a calculated value becomes larger than a predetermined threshold value.

What is claimed is:

1. A controller of an injection molding machine, comprising:
    a servomotor for driving an axis;
    a drive device for driving the servomotor;
    a power supply;
    a power supply converter for boosting voltage from the power supply and for supplying electric power to the drive device; and an electric storage unit coupled between the power supply converter and the drive device, wherein the controller further includes:

a voltage detection unit for detecting a voltage of the electric storage unit,
   an electric energy detection unit for detecting a supply of electric energy from the power supply to the electric storage unit, and
   an abnormality detection unit for detecting abnormality of the voltage detection unit based on
 (a) the voltage of the electric storage unit detected by the voltage detection unit,
 (b) the supply of electric energy to the electric storage unit detected by the electric energy detection unit, and
 (c) an electrostatic capacity of the electric storage unit.

2. The controller of an injection molding machine according to claim 1, wherein the abnormality detection unit calculates electrostatic energy accumulated in the electric storage unit based on the voltage of the electric storage unit detected by the voltage detection unit and the electrostatic capacity of the electric storage unit, compares the calculated electrostatic energy of the electric storage unit and the supply of electric energy to the electric storage unit detected by the electric energy detection unit with each other, and detects abnormality of the voltage detection unit based on a result of the comparison.

3. The controller of an injection molding machine according to claim 1, wherein the abnormality detection unit calculates an estimated voltage value of the electric storage unit based on the supply of electric energy to the electric storage unit detected by the electric energy detection unit and the electrostatic capacity of the electric storage unit, compares the calculated estimated voltage value of the electric storage unit and the voltage of the electric storage unit detected by the voltage detection unit with each other, and detects abnormality of the voltage detection unit based on a result of the comparison.

4. The controller of an injection molding machine according to claim 1, further comprising an elapsed time measuring unit for measuring time elapsed from arbitrary time during a boosting operation until the voltage detected by the voltage detection unit reaches boosted voltage, wherein the abnormality detection unit calculates boosting time of the electric storage unit based on the supply of electric energy to the electric storage unit detected by the electric energy detection unit, the electrostatic capacity of the electric storage unit, and a boosted voltage value of the electric storage unit, compares the calculated boosting time of the electric storage unit and the elapsed time measured by the elapsed time measuring unit with each other, and detects abnormality of the voltage detection unit based on a result of the comparison.

5. The controller of an injection molding machine according to claim 1, wherein the electric energy detection unit detects the supply of electric energy to the electric storage unit by integrating, with respect to time, any one of electric power supplied from the power supply converter to the electric storage unit, and electric power obtained by subtracting power consumption of the servomotor which consumes electric power of the electric storage unit from the electric power supplied from the power supply converter to the electric storage unit.

* * * * *